United States Patent

[11] 3,589,195

[72] Inventor James W. Angus
  Baldwin, N.Y.
[21] Appl. No. 860,906
[22] Filed Sept. 25, 1969
[45] Patented June 29, 1971
[73] Assignee Kollsman Instrument Corporation
  Syosset, N.Y.

[54] RUGGEDIZED ROCKING SHAFT
  4 Claims, 5 Drawing Figs.
[52] U.S. Cl. .................................. 73/386,
  73/393
[51] Int. Cl. ................................. G01l 7/12
[50] Field of Search ........................... 73/393,
  386, 387, 205 D

[56] References Cited
  UNITED STATES PATENTS
  2,166,603 7/1939 Menzer ................. 73/386

FOREIGN PATENTS
903,186 8/1962 Great Britain ................ 73/386

Primary Examiner—Donald O. Woodiel
Attorneys—E. Manning Giles, J. Patrick Cagney, Peter S. Lucyshyn and Richard G. Kinney ABSTRACT: A calibration arm assembly for a servo-pneumatic altimeter is connected to avoid degrading torque conditions so that the original sensing of the pressure actuated mode is maintained. The assembly includes a generally L-shaped support having a base, a vertical arm and crank arm extending transversely between the top portion of the vertical arm and the rocking shaft for locating the support alongside the rocking shaft. The base of the support mounts one end of a bimetallic temperature compensator in nominally parallel relationship with the rocking shaft, the other end of the compensator being pin-connected with a link connected with the altimeter pressure capsule. The support is configured so that the axis of the link is substantially coplanar with the axis of the crank arm to accommodate opposing forces without developing torque about the axis of the crank arm.

PATENTED JUN29 1971 3,589,195

INVENTOR
James W. Angus

BY J. Patrick Cagney
ATTY.

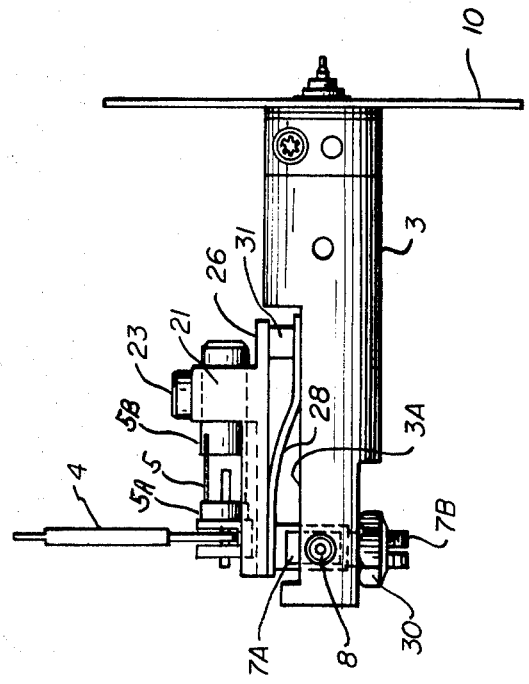
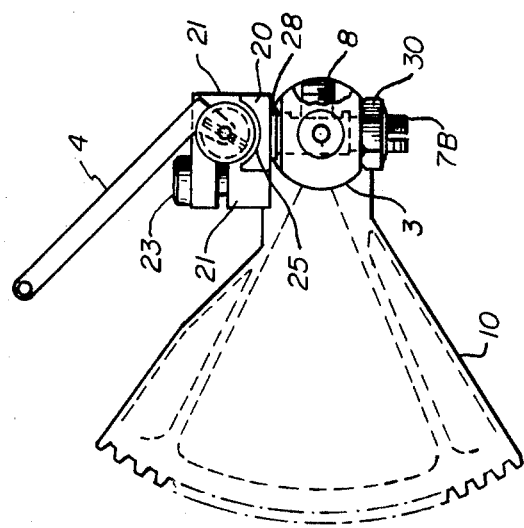
INVENTOR
James W. Angus
BY J. Patrick Cagney
ATTY.

RUGGEDIZED ROCKING SHAFT

BACKGROUND OF THE INVENTION

CROSS-REFERENCES

The following U.S. Pats. are assigned to the assignee of the present invention:
Andresen, U.S. Pat. No. 3,160,012
Angst, U.S. Pat. No. 2,689,480

The present invention relates generally to servo-pneumatic aircraft instruments and, more particularly, to an improved calibration arm assembly for determining the motion transfer between an altimeter pressure capsule and rocking shaft.

Servo-pneumatic altimeters, such as disclosed in Andresen U.S. Pat. No. 3,160,012, incorporate a control system wherein a pressure actuated altimeter mechanism is overridden so that the altimeter indicating pointer is positioned in accordance with an entirely separate, remote source of information. Briefly, in the above patent an instrument pointer shaft is directly driven according to a parameter which is electrically transmitted to the instrument and, responsive to a failure thereof, the instrument reverts to a direct pressure actuated mode of operation. A signal representative of the difference between the transmitted electrical parameter and the position of the pointer (as determined by a pressure sensitive diaphragm) is amplified and applied to drive the rotor of a drag-cup motor, which is mechanically connected with the pointer shaft, until the shaft position agrees with the transmitted electrical parameter. Accordingly, the pointer shaft of the instrument is accurately positioned by the electrical system independently of the instrument pressure sensing components. In doing so it must overcome by force the pressure sensing mechanism in the indicator.

In the above patent, the calibration arm assembly is shown to comprise the crank-link assembly connecting the pressure capsule and rocking shaft. Thus, by changing the effective leverage length of the crank, the motion transfer function relation between the rocking shaft and pressure capsule can be varied. The calibration arm assembly of the above patent differs from the assembly of the present invention in that no facilities are provided whereby the determined function relation can be corrected for temperature fluctuation.

A calibration arm assembly that does provide for such a temperature correction is as shown in FIG. 5 of U.S. Pat. No. 2,689,480 referenced above. Briefly, the temperature compensator of that patent is shown to comprise a bimetallic member or strip which is supported in nominally parallel relationship with respect to the rocking shaft. The arrangement is such that the distance of the bimetallic member from the rocking shaft is variable without disturbance of the parallel relationship. Such is accomplished by securing the bottom end of the bimetallic member to a crank arm which extends transversely between the bimetallic member and rocking shaft. The top end of the bimetallic member is provided with a head and a link is pin-connected between the head and the pressure capsule. The arrangement permits manual and automatic adjustment of the effective leverage length of crank arm at which the link acts on the rocking shaft. That is, the link can be manually adjusted by loosening a setscrew which bears against a flat portion of the crank arm internally of the rocking shaft and manually increasing or decreasing the distance between rocking ROCKING shaft and bimetallic member. Changes in temperature automatically cause the bimetallic member to flex thereby altering the effective length of the crank arm at which the link acts on the rocking shaft.

Because of the criticality of temperature correction of the motion transfer function relation, the calibration arm assembly of U.S. Pat. No. 2,689,480 has been incorporated into altimeters of the type shown in U.S. Pat. No. 3,160,012. While the result has been an altimeter of excellent sensitivity and of proven reliability, it has been noted that such instruments are subject to somewhat degraded performance when they revert to the pressure actuated mode after a period of use with excessive correction being applied.

SUMMARY OF THE INVENTION

The present invention has shown that a torque about the axis of the crank arm results from the offset between the line of action of the diaphragm and the line of action of the crank arm. In the servo-pneumatic altimeter this torque is dependent upon the level of the opposing forces existing while motion is transmitted due to the action of the electrically powered servomechanism overriding the pressure actuated mechanism of the total system.

It has been shown that the torque acting about the axis of the crank arm produces wear in the form of impressions made on the crank arm by the setscrew which anchors the arm to the rocking shaft. These indentations can occur after a period of normal use or can occur more rapidly where unusual force levels are encountered. The indentations allow the crank arm to rotate a small angle (on the order of 0.6°) thereby affecting the accuracy of the motion transfer function between the pressure capsule and the rocking shaft when the altimeter reverts to its pressure actuated mode.

In accordance with the present invention, a calibration arm assembly incorporates a support for the compensating means so that the axis of the link that connects to the compensating means is substantially coplanar with the axis of the crank arm to enable transmission of opposing forces between the capsule and rocking shaft free of torque about the axis of the crank arm.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same:

FIG. 3 is a top plan view of a calibration arm assembly of the present invention and shows the assembly connecting the link with the rocking shaft;

FIG. 4 is a side elevational view of the calibration arm assembly of FIG. 3.

DETAILED DESCRIPTION

Figure 1:
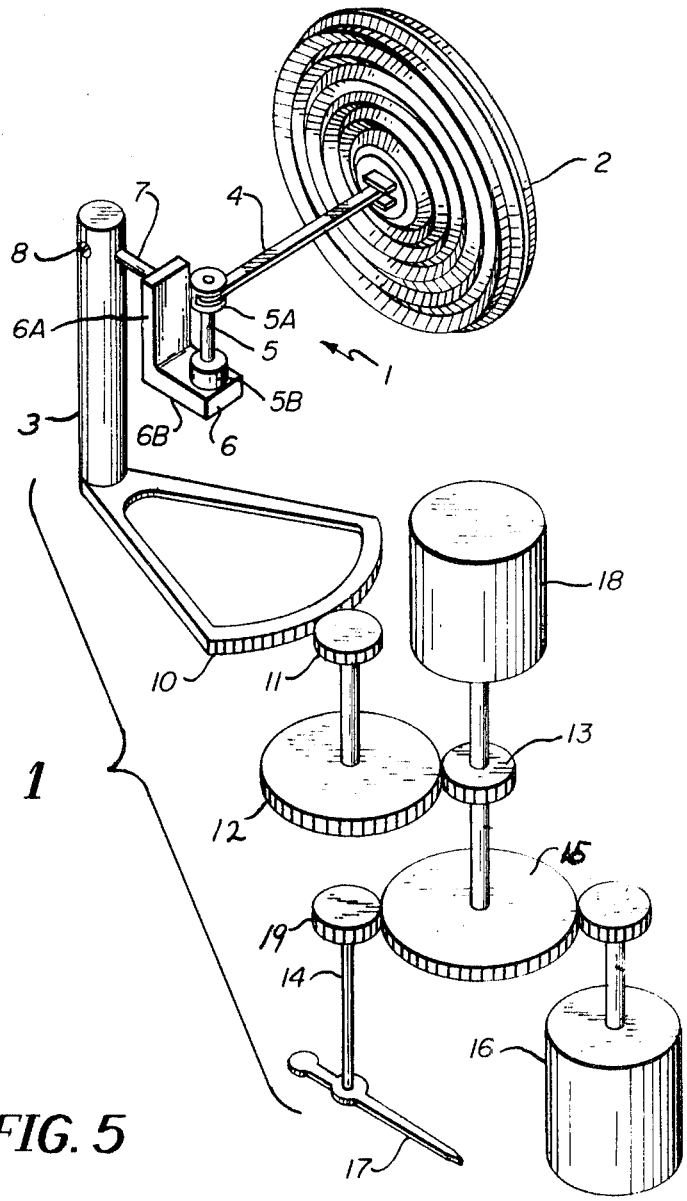
FIG. 1 depicts in simplified manner the elements comprising an altimeter incorporating a calibration arm assembly of the present invention.

Turning now to the drawings and specifically to FIG. 1 there is shown a servo-pneumatic aircraft altimeter incorporating the calibration arm assembly 1 of the present invention.

Briefly, the altimeter depicted in FIG. 1 incorporates an aneroid system comprising a diaphragm type pressure capsule 2 which expands and contracts in response to static pressures applied thereto. The output of the diaphragm or capsule 2 is a linear function which is transmitted to a rocking shaft 3 which operates in a rotary function. The rocking shaft 3 drives gear sector 10 which is typically designed such that a full deflection of diaphragm 2 will result in approximately full rotation of pinion 11. Rotation of the pinion 11 is transmitted to rotary motion of the instrument output shaft 14 through the gear train comprising gears 12, 13, 15 and 19. In the altimeter of FIG. 1, the gear train is designed such that the output shaft 14 will be caused to rotate one full revolution for each 1,000 feet of altitude.

Certain characteristic errors are inherent to the pneumatic drive mechanisms which can be predicted. One manner for correcting for such errors is to utilize a servo-drive system to override the pneumatic drive system. Accordingly, synchro control transformer 18 receives signals from a remote on-board computer (not shown) and directs the drag-cup motor 16 to apply a torque to position the indicator 17 in defiance to the pressure actuated system. Thus, if the position of pointer 17 as represented by the output of synchro 18 is different from the position represented by the remote signal of the onboard computer, an error signal is delivered to an amplifier (not shown) which energizes the drag-cup motor 16 so that the torque thereof depends upon the magnitude of the error signal while the direction of rotation of motor 16 depends upon the sense of the error signal. When the error signal approaches zero the altimeter indication will approach that determined by the computer. In the event of a power failure or electrical malfunction, or when the servo becomes inoperative, the servo 18 is deenergized and the pointer 17 immediately returns to the position determined by the pressure capsule 2.

Figure 2:
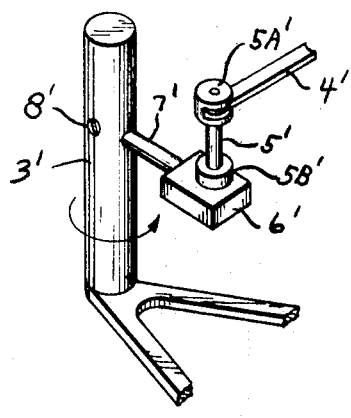
FIG. 2 depicts a prior art calibration arm as incorporated into an altimeter of FIG. 1.

The present invention relates to the calibration arm assembly which, as shown in FIG. 1, connects the rocking shaft 3 (rotating function) and the diaphragm 2 (linear function) which is used to calibrate the motion transfer function therebetween. To facilitate understanding of the invention, reference is made to a prior art calibration arm assembly, as shown in FIG. 2, that corrects for temperature fluctuation. This prior arrangement includes a support 6' and a crank arm 7' extending transversely between the rocking shaft 3' and the support 6' to carry the support alongside the rocking shaft. A temperature compensator 5', which comprises a bimetallic member or strip, is shown having one end mounted on a cylindrical arm 5B' and having its other end carrying a head 5A'. A link 4' is pin-connected to the head 5A'. The crank arm 7' projects into a transverse bore in the rocking shaft and is adjustably mounted therein by means of a setscrew 8' which bears against a flat portion provided on the crank arm 7'.

Inaccurate indications have been discovered in some of the prior calibration arm assemblies when the altimeter reverts to its pressure actuated mode but the underlying problem has proven difficult to identify. Recognition of the fundamental problem is an important aspect of the present invention.

In this respect, it will be noted that in the arrangement shown in FIG. 2 an offset exists between the crank arm 7' and link 4'. When the servo makes a correction due to a difference between the pneumatically sensed altitude and the computed altitude, the mechanical elements are positioned against the action of the diaphragm 2 which acts as a spring. The diaphragm 2 exerts a resistive force against the calibration arm assembly which results in a torsional reactance at the point where the crank arm 7' is attached to the rocking shaft 3'. Typically, the diameter of the crank arm 7' at the point of attachment is between one-sixth and three thirty-seconds inch. It has been discovered that if a torque is transmitted through this attachment, the crank arm tends to rotate and an impression is made into the arm by the setscrew 8' allowing the crank arm 7' to rotate a small angle (approximately 0.6°) which results in a degraded indication when the altimeter reverts to its pressure actuated mode. The space limitations and degree of access and adjustment preclude utilization of heavier parts such as would minimize this problem.

In a preferred embodiment in accordance with the present invention, the calibration arm assembly places the attachment point of the crank arm 7 in line with the resistive force of the diaphragm 2 thereby eliminating the torsion condition at the anchoring setscrew 8. In the preferred embodiment shown in FIG. 1, the calibration arm assembly includes an "L"-shaped support 6 that accomplishes this function without losing any of the accessibility or adjustability required of the part. Tests have shown this design to be impervious to the offset problem previously experienced.

Figure 5:
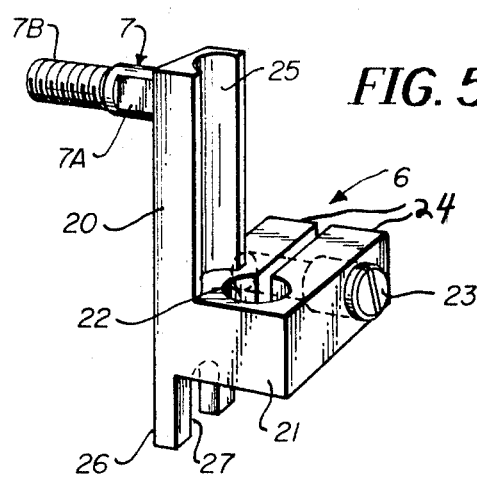
FIG. 5 is a perspective view of the calibration arm assembly with the bimetallic temperature compensator removed.

As best shown in FIG. 5, the generally L-shaped support 6 is a one-piece metal casting having a base 21, an upstanding arm 20 carried on the base at one edge thereof, and an integral crank arm 7 projecting sideways from the top of the arm 20.

The base 21 has a clamping socket 22 bordered by jaw portions 24 that are controlled by a screw 23.

The upstanding arm 20 has a concave groove 25 along its inside face to provide clearance for off axis deflection of the temperature compensator. The crank terminates in a threaded portion 7B projecting through the transverse bore in the rocking shaft to receive an anchor nut 30 that fixes the lengthwise position of the crank arm so that an intermediate flat portion 7A is in registry with the setscrew 8.

The temperature compensator 5 is a bimetal element of rectangular shape. As best shown in FIG. 4, the compensator 5 is equipped with a mounting plug 5B that is received in the clamping socket 22 and an adapter head 5A that provides a pin joint connection for link 4.

The support 6 is mounted adjacent a flat lengthwise portion 3A of rocking shaft 3 with the vertical support arm 20 parallel to the axis of rocking shaft 3 and with the crank arm 7 extending through the rocking shaft 3. In order to accurately calibrate motion between the pressure capsule 2 and rocking shaft 3, a spring 28 is secured to the flat 3A of rocking shaft 3 by pin 31 so that the support 6 is biased away from the rocking shaft. The proper distance between the axis of the rocking shaft and the pivot axis (provided by head 5A for link 4) which determines the effective leverage length of link 4 relative to the rocking shaft is established by adjustment of nut 30. When the proper distance has been established, the setscrew 8 is tightened against the flat 7A of crank arm 7.

As is the case with the prior art arrangement, the arrangement of the present invention is such that the distance of the head 5A from the rocking shaft 3 is variable without disturbance of the parallel relationship of the bimetallic compensator 5 with respect to the rocking shaft 3. For this purpose, the one piece support 6 includes a depending guide portion 26 provided with a "U"-shaped slot 27 for axial movement along pin 31.

Changes in temperature cause the bimetallic compensator 5 to flex. In the position shown the bimetallic compensator 5 tends to increase and decrease, in dependence upon temperature, the effective leverage length of the crank arm 7 at which link 4 acts on the rocking shaft. The influence of the bimetallic compensator 5 may be lessened by turning its supporting cylindrical arm 5B relatively to the horizontal support arm 21 after loosening of the screw 23.

It will be noted that in the present arrangement, the axis of the link 4 is always substantially coplanar with the axis of the crank arm 20 so that the opposing forces acting through the mechanism transmit motion without developing a torque about the axis of the crank arm. This avoids the problem which has previously caused degraded altitude readings when the altimeter reverts to the pressure actuated mode after excessive correction has been applied.

I claim:

1. In an altimeter having a pressure sensitive capsule movable in a linear function, a rocking shaft movable in a rotating function in predetermined relation with respect to the capsule, mechanism for imparting corrective force and movement to the rocking shaft in opposition to the capsule, and bimetallic temperature compensating means having first and second opposed end regions, the first of said end regions being connected with said capsule, a support connecting said rocking shaft with said compensator means for determining a motion transfer function between said rocking shaft and said capsule when the altimeter reverts to its pressure actuated mode, said support including a base, an upstanding arm extending upwardly from the base, and a crank arm having an axis and extending transversely from the vertical arm near the top portion thereof, the end region of said crank arm remote from said vertical arm being adapted for adjustable connection with said rocking shaft to adjustably locate said base alongside the rocking shaft, said base having a pair of adjustable jaw portions for adjustably gripping the second of said end regions of said compensator means to locate said compensator means alongside said vertical arm and substantially parallel to the axis of said rocking shaft so that the first of said end regions of said compensator means and the axis of said crank arm determine a plane substantially normal to the axis of said rocking shaft.

2. In an altimeter having a pressure sensitive capsule movable in a linear function, a rocking shaft movable in a rotating function in predetermined relation with respect to the capsule, and mechanism for imparting corrective force and movement TO THE ROCKING SHAFT IN OPPOSITION TO THE CAPSULE, a calibration arm assembly connected in both force and travel transmitting relation between the capsule and rocking shaft for determining a motion transfer function therebetween when the altimeter reverts to its pressure actuated mode, said assembly including a support having a transverse crank arm having an axis and extending through the rocking shaft to locate the support alongside the rocking shaft, temperature compensating means mounted to the support, and a link having an axis and connected between the capsule and the compensating means, the support mounting the compensating means so that the axis of the link is in a common plane with the axis of the crank arm which plane is generally transverse to the axis of the rocking shaft to enable transmission of opposing forces between the capsule and rocking shaft free of torque about the axis of the crank arm, whereby the accuracy when the altimeter reverts to its pressure actuated mode is not degraded by the opposing forces previously acting through the calibration arm assembly.

3. In an altimeter in accordance with claim 2 wherein said plane is normal to the axis of the rocking shaft.

4. In an altimeter calibration arm assembly for connecting in both force and travel transmitting relation a pressure sensitive capsule of the altimeter with a rocking shaft thereof, the assembly including an elongated bimetallic temperature compensator element having a pair of opposite end regions, one of said end regions being connected through a linkage with the capsule, a support for connecting said compensator element with said rocking shaft, the improvement wherein said support comprises a base, an upstanding arm extending upwardly from the base, and a crank arm having an axis and extending transversely from the upstanding arm near the top portion thereof, the end region of said crank arm remote from said vertical arm being adapted for adjustable connection with said rocking shaft to adjustably locate said base alongside the rocking shaft, said base having clamping means for adjustably gripping the other of said end regions of said compensator element to locate said compensator element alongside said vertical arm and substantially parallel to the axis of said rocking shaft so that said one of said end regions of said compensator element and the axis of said crank arm determine a plane substantially normal to the axis of said rocking shaft.